United States Patent Office 3,319,363
Patented May 16, 1967

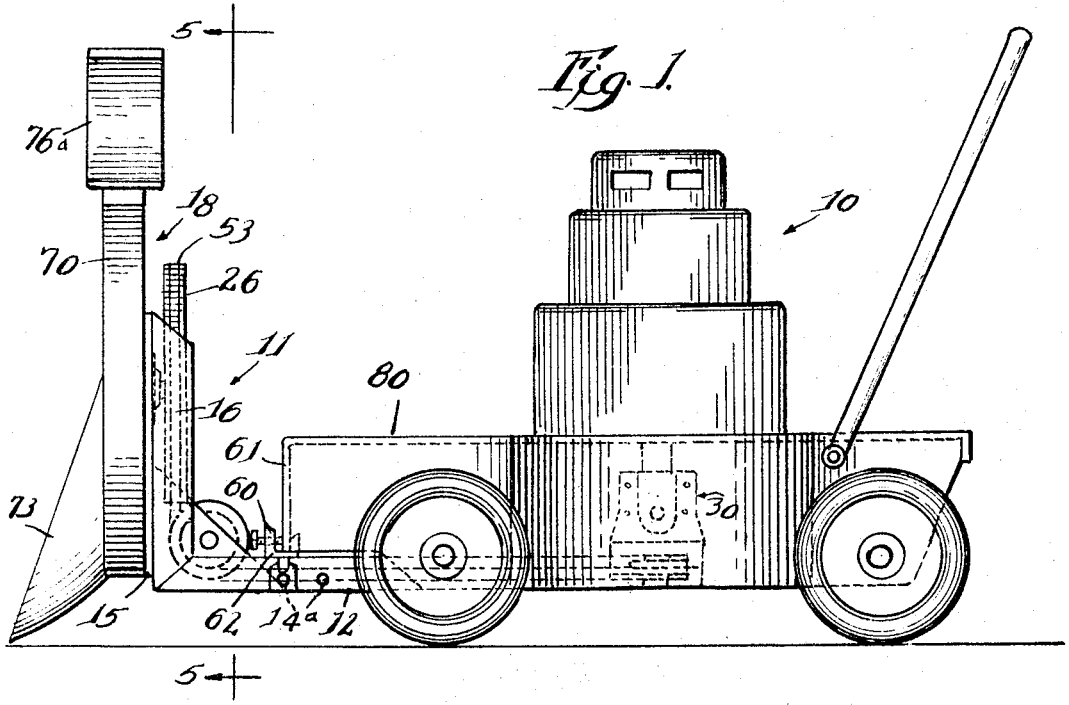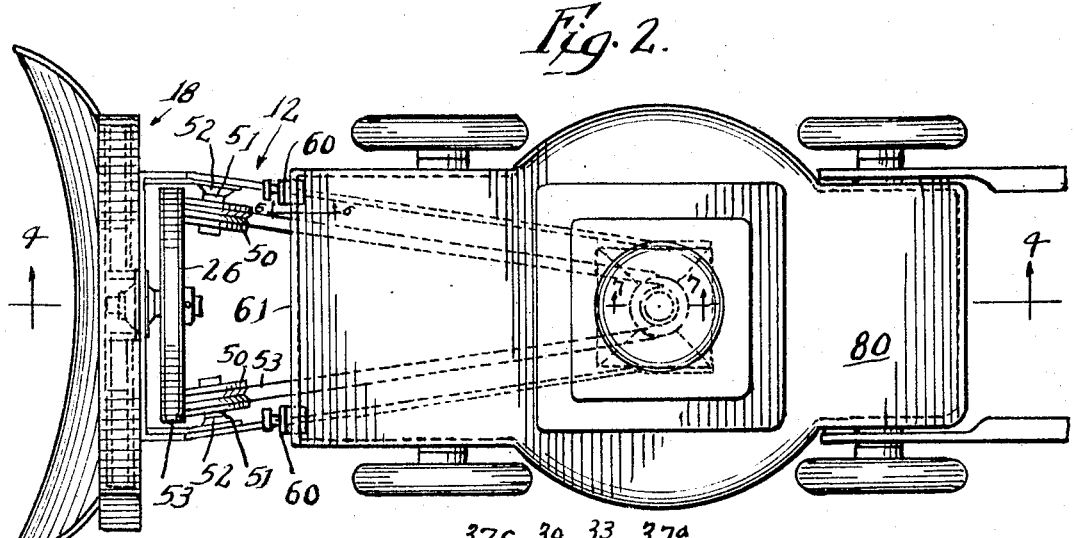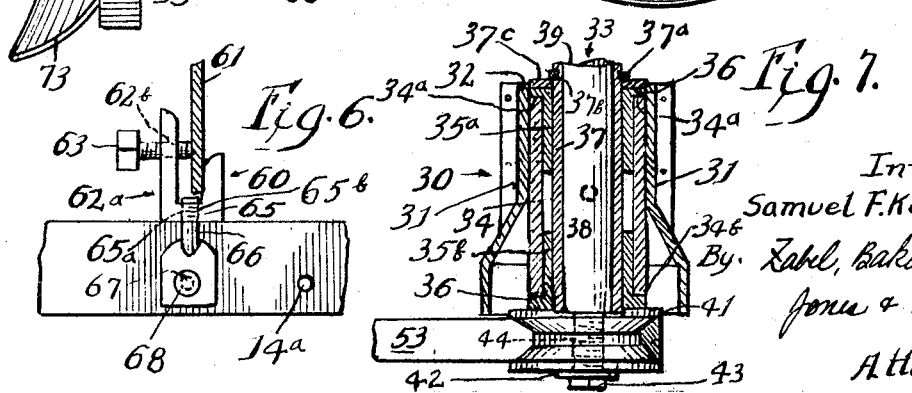

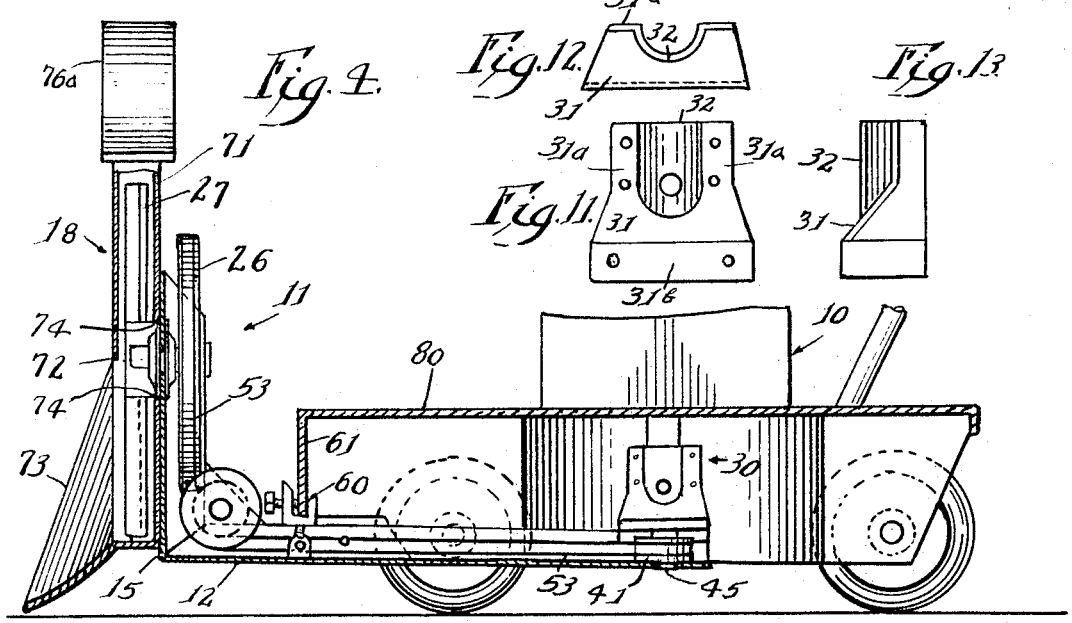
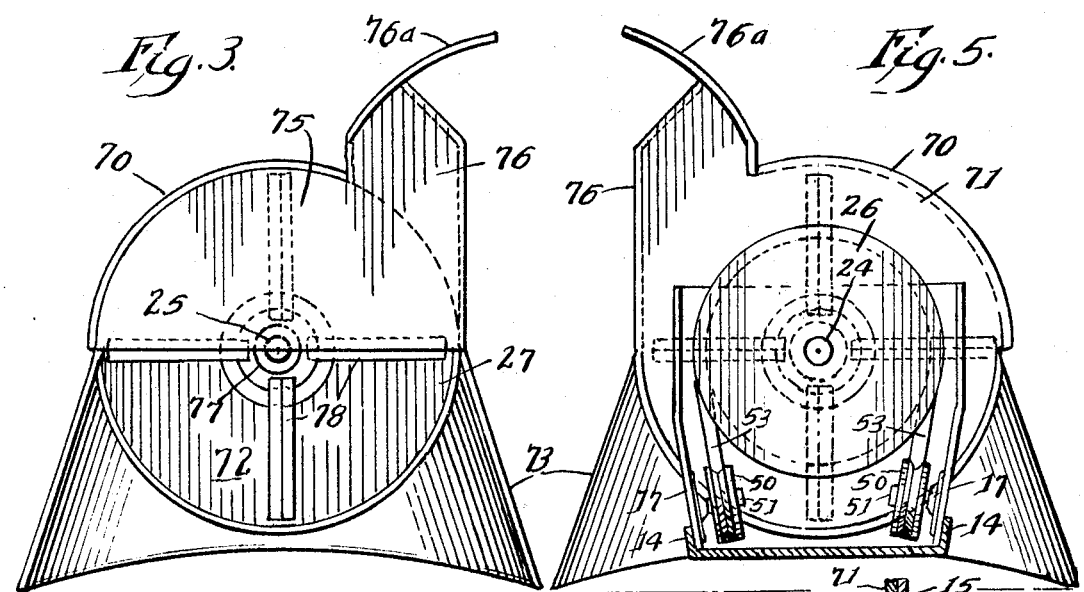
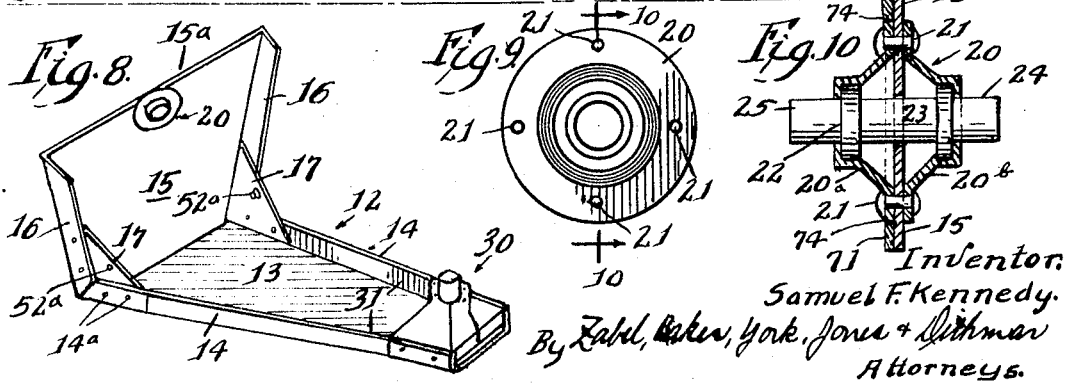

3,319,363
SNOW REMOVER ATTACHMENT FOR POWER
LAWN MOWERS
Samuel F. Kennedy, 917–19 S. Webster St.,
Taylorville, Ill. 62568
Filed Oct. 19, 1964, Ser. No. 404,700
10 Claims. (Cl. 37—43)

My present invention relates to a device for converting a conventional rotary-type power lawn mower to an implement suitable for removing snow and other matter from sidewalks, driveways and other areas about a home, or other premises.

An object of this invention is to provide a simple attachment which a person accustomed to operate such a lawn mower can readily substitute for the mowing element and thereby convert the mower to an efficient snow remover.

Another object is to provide compact, efficient, durable and economical means for supporting a blower unit, including an impeller, on and driving the impeller from the shaft of the motor of a conventional power lawn mower.

A further object is to provide auxiliary adjustable means for enhancing firmness and security of support for such a blower unit in operative relation with the motor shaft.

An additional object is to provide a simple, compact and relatively inexpensive unitary attachment of the character stated readily installable by an average homeowner on a power lawn mower for operation in lieu of the mower element thereof.

Other objects and advantages of the invention will appear as the description proceeds in relation to the accompanying drawings.

In the drawings:

FIG. 1 is a side elevation of an attachment embodying my invention mounted in operable position on a conventional power lawn mower of the rotary type, partly broken away.

FIG. 2 is a top plan view of the same arrangement.

FIG. 3 is a front elevation of the attachment alone.

FIG. 4 is a sectional view along the line 4—4 of FIG. 2, partially broken away.

FIG. 5 is a rear elevation of the attachment partially broken away.

FIG. 6 is a fragmentary enlarged sectional view along the line 6—6 of FIG. 2.

FIG. 7 is an enlarged view of a portion of the invention shown in FIG. 4, in section.

FIG. 8 is a perspective view of a part of the invention.

FIG. 9 is a detail end view of a part of the invention shown in FIG. 2.

FIG. 10 is a sectional view along the line 10—10 of FIG. 9.

FIG. 11 is a side view of a part of the invention shown in FIG. 4.

FIG. 12 is a top plan view of the part shown in FIG. 11.

FIG. 13 is an end view of the part shown in FIG. 11.

Referring to the drawings, the power lawn mower 10 shown in FIGS. 1 and 2 is of conventional type. The attachment 11 comprises a supporting frame 12, which, in the arrangement shown, is formed of 20 gauge galvanized steel, and includes a generally trapezoidal flat bottom portion or base 13, with longitudinally extending generally upstanding angular flanges 14, an upturned forward end portion or wall 15, with rearwardly extending angular flanges 16. Triangular corner brace plates 17 of 16 gauge galvanized steel, riveted to the flanges 14 and 16, respectively, serve to maintain the wall 15 at right angles to the base 13.

Midway of the flanges 14 and 16 of wall 15 in suitable spaced relation with the upper edge 15a means are provided for supporting a blower unit 18. These comprise a circular cutaway portion, and a bearing retainer 20 (FIG. 10) secured in position on wall 15 by means of rivets 21 extending through said wall.

Bearing retainer 20 comprises generally dish-shape members 20a and 20b disposed on opposite sides of wall 15 and supports a bearing 22 for an impeller shaft 23 extending therethrough and having projecting end portions 24, 25, upon which an impeller sheave 26 and an impeller 27, respectively, are mounted for rotation with shaft 23.

A generally tubular drive shaft bearing housing or yoke 30 (FIGS. 7, 8) is provided adjacent the narrow end of base 13. This comprises opposed side wall members 31 having opposing flange portions 31a riveted together and at their bottom portions 31b riveted to flanges 14 of base 13. Side wall members are so conformed as to provide an upper constricted tubular portion 32 of yoke 30.

Yoke 30 (FIG. 7) is adapted to receive and support a conventional sleeve bearing and drive shaft extension unit 33. This unit 33 comprises a sleeve 34 extending vertically therethrough and maintained in position by means of opposed collars 35a, 35b, having outstanding flanges 36 abutting the ends 34a, 34b of sleeve 34. Unit 33 also includes a tubular extension 37 adapted to reecive the exposed end 38 of the drive shaft 39 of a power mower 10 upon removal of the mower blade, and conventionally keyed to the shaft 39 for rotation therewith.

Relative axial movement of extension 37 and shaft 39 is restricted at the upper end of the extension by conventional means such as a snap ring 37a, groove 37b, and washer 37c.

Shaft extension 37 at its lower extremity is also adapted to receive for rotation therewith a drive sheave 41.

Shaft 39, extension 37 and sheave 41 are maintained in operative relation by means of a washer 42 and a threaded bolt 43 which is received in threaded bore 44 in and coaxial with end 38 of drive shaft 39. A suitable hole 45 in base 13 (FIG. 4) affords access for this purpose.

Rearwardly of forward wall 15 means are provided (FIGS. 2, 5) for the support of idler sheaves 50. These include stub shafts 51 upon which the sheaves 50 are mounted for relative rotation. Stub shafts 51 are supported on brace plates 17 which are provided with bosses 52, 52 having suitable bores 52a for receiving shafts 51 in fixed relation. The arrangement of the sheaves 26, 41 and 50 and their respective shafts is such that upon rotation of the drive shaft 39 belt 53, being arranged in operative relation over these sheaves, will transmit the motive power of shaft 39 to sheave 26 and impeller shaft 23 thereby to rotate impeller 27 and operate the blower system.

Forwardly of yoke 30 adjustable auxiliary means for the support of frame 12 are provided. These comprise a pair of clamps 60 arranged to engage depending housing skirt 61 of mower 10 in clamping relation. As shown in FIGS. 1, 6 these clamps are adjustably mounted on flanges 14 so as to accommodate mowers and skirts of various dimensions. For this purpose opposed spaced holes 14a are provided in flanges 14 in suitable spaced relation with the axis of rotation of shaft extension 37.

Clamps 60 comprise a generally U-shape member 62 adapted to receive a portion of skirt 61 and having on one arm 62a a threaded bore 62b for receiving a set screw 63 adjustable to engage and be disengaged from the skirt 61. Web 65 of members 62 is provided with a threaded bore 65a for receiving threaded end 65b of a depending spade bolt 66, which in turn has a threaded bore 67 for receiving a bolt 68 which is receivable in holes 14a for securing clamp 60 in positions of adjustment along flanges 14.

Blower unit 18 includes a housing 70 (FIGS. 1, 3, 4, 5) which is supported on wall 15 forwardly thereof by rivets, welding or other suitable means. Housing 70 is generally tubular in form; closed at one end 71, partially open at the opposite end 72; and provided along its lower periphery with an angular forwardly extending skirt or scoop portion 73. A central opening or bore 74 (FIGS. 4, 10) is provided in end 71 to accommodate the forwardly projecting portion 25 of impeller shaft 23 and the forwardly extending portion of bearing retainer 20 and is of such diameter as to receive the periphery of the outer flange of the retainer member 20a in smoothly fitting relation, thus facilitating the centering of the housing 70 against wall 15 and the riveting of the two together.

Housing 70 is also provided in its upper peripheral portion 75 with a chute or outlet 76 and deflector 76a for discharge of snow or other matter therefrom.

Impeller 23 has a central hub portion 77 with blades 78 extending radially therefrom and is mounted for rotation within the housing 70. Impeller 23, blades 78, scoop 73, housing 70 and chute 76 are so conformed and arranged to cooperate that upon rotation of the impeller at suitable speed while the implement is being advanced in a snow covered area snow encountered in its path will be drawn rapidly and efficiently from the scoop 73 into housing 70 and be discharged through chute 76 clear of the implement and its path of movement, thus to provide simple and efficacious means for the achievement of the stated objectives.

The housing 80 of the conventional gasoline engine type of rotary lawn mower 10 is generally of inverted pan-shape and may vary in size with variations in other features of the implement; hence, the desirability and advantage of the adjustable clamping means which I have provided. These serve to enhance steadiness and ease of operation for snow removing purposes.

The lower edge of skirt 61 of housing 80 is generally spaced several inches above ground level thus affording ample room for attachment 11 the flanges 14 of which are proportioned accordingly.

It will be noted that the supporting frame 12 with its flat base 13, its side wall flanges 14, and forward wall 15 provides a shield for the sheaves and belt against snow agitated in the removal operation.

The simplicity, compactness, efficiency and economy of my attachment are apparent. Upon tilting the lawn mower 10 and removing the cutting element therefrom the attachment 11 may be readily substituted for it by sliding the sleeve 37 upon the exposed end 38 of the mower drive shaft 39 and replacing the bolt 43 with washer 42 in place.

Clamps 60 may be readily placed in engagement with skirt 61 and secured in position by adjustment of set screws 63.

With the attachment 11 in place and the engine started the snow removal operation may proceed with impeller 27 rotating in a direction so that the blades 78 thereof, which are generally concave in the direction of rotation will cast snow encountered by scoop 73 upwardly into and outwardly of chute 76.

My invention is not to be taken as limited to the precise structure shown and described. Various changes and modifications may be made without departing from the substance of it. These will be considered to be within the claims, which follow.

I claim:

1. The combination of
   (a) a conventional gasoline engine powered lawn mower having a generally inverted pan shaped housing and a drive shaft driven by said engine and from which the usual rotary cutting element has been removed, said drive shaft depending generally centrally of said housing, said housing having a depending transverse skirt forming the forward wall of said housing, and
   (b) a snow removing attachment, said attachment comprising a supporting frame, a snow removing unit carried by said frame, power transmitting means carried by said frame for operating said snow removing unit, and including means adjacent one end thereof for operatively connecting said power transmitting means to said drive shaft in lieu of said cutting element and for supporting said frame on said drive shaft, adjustable means carrier by said frame in association with said skirt for supplementally supporting said frame on said housing,
      the parts of said attachment being so conformed and arranged in relation to one another and to said housing and drive shaft, and adapted to operate, whereby said attachment may be connected to said lawn mower for operation and removed therefrom readily and as a unit.

2. The combination of claim 1 in which the supporting frame comprises a generally trapezoidal flat base with generally upstanding flanges extending longitudinally along opposed sides thereof, and a yoke supported on said base adjacent its narrow extremity, said yoke being adapted to support said means for operatively connecting said power transmitting means to said drive shaft.

3. The combination of claim 1 in which the supporting frame comprises a generally trapezoidal flat base with generally upstanding flanges extending longitudinally along opposed sides thereof, and an upstanding wall adjacent its broad extremity, said upstanding wall having outstanding flanges extending vertically along opposed sides thereof, and braces securing together said upstanding flanges and outstanding flanges, respectively adjacent to one another to reinforce said wall, said wall being adapted to support said snow remover unit in operative position.

4. The combination of claim 3 in which the longitudinally extending flanges flare outwardly and said braces tilt correspondingly, said braces being provided with means for supporting said power transmitting means obliquely in relation to said base.

5. A snow removing attachment for a conventional power lawn mower having a housing and a drive shaft depending therefrom,
   said housing having a skirt extending transversely of said lawn mower forwardly of said shaft,
   said snow removing attachment comprising
      (a) a supporting frame,
      (b) a snow removing unit carried by said frame adjacent one end thereof,
      (c) means carried by said frame for transmitting power to operate said unit,
      (d) means carried by said frame adjacent an opposed end thereof for operatively connecting said power transmitting means and said drive shaft, and including means for supporting said frame on said drive shaft,
      (e) and adjustable means carried by said frame for engagement with said skirt supplementally to support said frame on said housing, said frame, said snow removing unit, said power transmitting means and said connecting means being so conformed and arranged in relation to one another whereby to provide a compact efficient snow removing instrumentality adapted for ready operative attachment to and removal from such a lawn mower as a unit.

6. A snow removing attachment according to claim 5 in which the supporting frame comprises a generally trapezoidal base and the adjustable means carried by said frame comprise a plurality of clamping means disposed in adjustable spaced relation to each other and to said base, whereby to provide adjustable three-point suspension for said attachment in relation to said lawn mower.

7. A snow removing attachment for a conventional gasoline engine powered lawn mower having a generally inverted pan shaped housing and a drive shaft driven by said engine from which the usual rotary cutting element has been removed, said drive shaft depending generally centrally of said housing, and said housing having a depending transverse skirt forming the forward wall of said housing, said attachment comprising
- (a) a supporting frame,
- (b) a snow removing unit carried by said frame,
- (c) means carried by said frame for transmitting power to operate said snow removing unit,
- (d) means adjacent one end of said frame for operatively connecting said power transmitting means to said drive shaft in lieu of said cutting element and for supporting said frame on said drive shaft,
- (e) adjustable means carried by said frame and cooperating with said skirt for supplementally supporting said frame on said housing,
    the parts of said attachment being so conformed and arranged in relation to one another whereby to provide a compact unitary instrumentality adapted for ready operative installation upon and removal from such a lawn mower.

8. An attachment according to claim 7 in which the supporting frame comprises a generally trapezoidal base with generally upstanding flanges extending longitudinally along opposed sides thereof, and a yoke supported on said base adjacent its narrow extremity, said yoke being adapted to support said means for operatively connecting said power transmitting means to said drive shaft.

9. An attachment according to claim 7 in which the supporting frame comprises a generally trapezoidal base with generally upstanding flanges extending longitudinally along opposed sides thereof, and an upstanding wall adjacent its broad extremity, said wall having outstanding flanges extending vertically along opposed sides thereof, and braces securing together said upstanding flanges and said outstanding flanges, respectively adjacent to one another, to reinforce said wall, said wall being adapted to support said now remover unit for operation and to shield said power transmitting means from snow agitated in the snow removing operation.

10. An attachment according to claim 7 in which the supporting frame comprises a generally trapezoidal base provided adjacent its narrow extremity with said means adapted to support said attachment on said drive shaft and adjacent its opposite extremity with means adapted to support said snow remover unit in operative relation with said drive shaft, said base being further provided intermediately of its two said extremities with said plurality of spaced adjustable means operable to clamp said attachment to said mower, whereby to enhance steadiness of operation of said snow remover unit.

References Cited by the Examiner

UNITED STATES PATENTS

| | | | |
|---|---|---|---|
| 2,675,660 | 4/1954 | Barnard. | |
| 2,797,502 | 7/1957 | Griffith et al. | 37—45 |
| 2,889,641 | 6/1959 | Rechenberg | 37—43 |
| 3,035,359 | 5/1962 | Ewert | 37—43 |
| 3,131,491 | 5/1964 | Durrschmidt | 37—43 |

FOREIGN PATENTS 95,598    2/1960    Norway.

ABRAHAM G. STONE, *Primary Examiner.*

R. L. HOLLISTER, *Assistant Examiner.*

UNITED STATES PATENT OFFICE
CERTIFICATE OF CORRECTION

Patent No. 3,319,363　　　　　　　　　　　　　　　　May 16, 1967

Samuel F. Kennedy

It is certified that error appears in the above identified patent and that said Letters Patent are hereby corrected as shown below:

Column 4, line 11, "carrier" should read -- carried --.
Column 6, line 7, "now" should read -- snow --.

Signed and sealed this 5th day of August 1969.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents